(12) United States Patent
Sugiyama et al.

(10) Patent No.: US 11,237,278 B2
(45) Date of Patent: Feb. 1, 2022

(54) RADIATION IMAGE ACQUISITION SYSTEM AND RADIATION IMAGE ACQUISITION METHOD

(71) Applicant: HAMAMATSU PHOTONICS K.K., Hamamatsu (JP)

(72) Inventors: Mototsugu Sugiyama, Hamamatsu (JP); Tatsuya Onishi, Hamamatsu (JP); Toshiyasu Suyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/890,325

(22) Filed: Jun. 2, 2020

(65) Prior Publication Data

US 2020/0292718 A1    Sep. 17, 2020

Related U.S. Application Data

(63) Continuation of application No. 15/764,439, filed as application No. PCT/JP2016/072441 on Jul. 29, 2016, now Pat. No. 10,859,715.

(30) Foreign Application Priority Data

Sep. 30, 2015  (JP) ................. 2015-194643

(51) Int. Cl.
*G01J 1/00* (2006.01)
*G01T 1/20* (2006.01)
(Continued)

(52) U.S. Cl.
CPC ............ *G01T 1/20* (2013.01); *G01T 1/2018* (2013.01); *G01T 7/08* (2013.01); *G06T 5/009* (2013.01); *G06T 2207/10116* (2013.01)

(58) Field of Classification Search
CPC .......... G01T 1/20; G01T 7/08; G01T 1/2018; G06T 5/009; G06T 2207/10116
See application file for complete search history.

(56) References Cited

U.S. PATENT DOCUMENTS 4,578,803 A    3/1986  Macovski
5,661,306 A    8/1997  Arakawa
(Continued)

FOREIGN PATENT DOCUMENTS

CN    1182882 A    5/1998
CN    1228163 A    9/1999
(Continued)

OTHER PUBLICATIONS

Kube et al., "Transverse beam profile imaging of few-micrometer beam sizes based on a scintillator screen," Sep. 13-17, 2015, pp. 330-334. (Year: 2015).*
(Continued)

*Primary Examiner* — Kiho Kim
(74) *Attorney, Agent, or Firm* — Faegre Drinker Biddle & Reath LLP

(57) ABSTRACT

A radiation image acquisition system includes a radiation source that outputs radiation toward an object, a scintillator that has an input surface to which the radiation output from the radiation source and transmitted through the object is input, converts the radiation input to the input surface into scintillation light, and is opaque to the scintillation light, an image capturing means that includes a lens portion focused on the input surface and configured to image the scintillation light output from the input surface and an image capturing unit configured to capture an image of the scintillation light imaged by the lens portion and outputs radiation image data of the object A, and an image generating unit that generates
(Continued)

a radiation image of the object based on the radiation image data output from the image capturing means.

15 Claims, 10 Drawing Sheets

(51) Int. Cl.
  *G01T 7/08* (2006.01)
  *G06T 5/00* (2006.01)

(56) References Cited

U.S. PATENT DOCUMENTS

| | | | |
|---|---|---|---|
| 5,728,213 | A | 3/1998 | Kurata et al. |
| 5,864,146 | A | 1/1999 | Karellas |
| 6,180,946 | B1 | 1/2001 | Ebstein |
| 6,236,058 | B1 | 5/2001 | Ikami |
| 6,624,436 | B1 | 9/2003 | Kohda |
| 7,130,375 | B1 | 10/2006 | Yun et al. |
| 7,135,686 | B1 | 11/2006 | Grady |
| 7,405,406 | B1 | 7/2008 | Nagarkar et al. |
| 9,255,996 | B2 | 2/2016 | Sugiyama et al. |
| 9,268,039 | B2 | 2/2016 | Sugiyama et al. |
| 9,279,890 | B2 | 3/2016 | Sugiyama et al. |
| 9,364,191 | B2 | 6/2016 | Ning et al. |
| 9,500,600 | B2 | 11/2016 | Sugiyama et al. |
| 10,101,469 | B2 | 10/2018 | Sugiyama et al. |
| 2001/0038707 | A1 | 11/2001 | Ohara |
| 2002/0017609 | A1 | 2/2002 | Danielsson |
| 2002/0027201 | A1 | 3/2002 | Agano |
| 2002/0122535 | A1 | 9/2002 | Moore et al. |
| 2002/0172324 | A1* | 11/2002 | Ellengogen ........ G01V 5/0025 378/57 |
| 2005/0072931 | A1 | 4/2005 | Albagli et al. |
| 2007/0114425 | A1 | 5/2007 | Wong et al. |
| 2008/0149855 | A1 | 6/2008 | Mehta et al. |
| 2010/0034353 | A1 | 2/2010 | Kravis et al. |
| 2010/0171075 | A1 | 7/2010 | Chen |
| 2010/0316187 | A1 | 12/2010 | Matoba |
| 2012/0145911 | A1 | 6/2012 | Suyama |
| 2013/0141115 | A1 | 6/2013 | Bourely et al. |
| 2014/0016752 | A1 | 1/2014 | Sugiyama et al. |
| 2014/0016753 | A1 | 1/2014 | Sugiyama et al. |
| 2014/0016754 | A1 | 1/2014 | Sugiyama et al. |
| 2014/0021372 | A1 | 1/2014 | Suyama et al. |
| 2014/0211918 | A1 | 1/2014 | Suyama et al. |
| 2014/0064445 | A1 | 3/2014 | Adler |
| 2015/0185165 | A1 | 7/2015 | Sugiyama et al. |
| 2015/0377802 | A1 | 12/2015 | Decroux et al. |
| 2016/0103231 | A1 | 4/2016 | Sugiyama et al. |
| 2016/0259067 | A1* | 9/2016 | Morton ................. G01T 1/208 |
| 2017/0122886 | A1 | 5/2017 | Sugiyama et al. |

FOREIGN PATENT DOCUMENTS

| | | |
|---|---|---|
| CN | 101506905 A | 8/2009 |
| CN | 101371787 | 9/2010 |
| CN | 101836867 | 9/2010 |
| CN | 101937095 | 1/2011 |
| CN | 203616268 U | 5/2014 |
| CN | 103975233 A | 8/2014 |
| EP | 2813841 A1 | 12/2014 |
| EP | 2876466 A1 | 5/2015 |
| JP | S61-95299 A | 5/1986 |
| JP | S63-79043 | 4/1988 |
| JP | H5-152391 | 6/1993 |
| JP | H05-312734 A | 11/1993 |
| JP | 7-27866 A | 1/1995 |
| JP | H8-61941 | 3/1996 |
| JP | H11-211677 A | 8/1999 |
| JP | 2000-039407 A | 2/2000 |
| JP | 2000-510729 A | 8/2000 |
| JP | 2000-298198 | 10/2000 |
| JP | 2001-004561 | 1/2001 |
| JP | 2001-215201 A | 8/2001 |
| JP | 2001-299733 A | 10/2001 |
| JP | 2001-356173 A | 12/2001 |
| JP | 2002-301054 A | 10/2002 |
| JP | 2003-264280 | 9/2003 |
| JP | 2004-536313 | 12/2004 |
| JP | 2005-207827 | 8/2005 |
| JP | 2007-139604 | 6/2007 |
| JP | 2007-155653 A | 6/2007 |
| JP | 2007-178228 A | 7/2007 |
| JP | 2007-327967 | 12/2007 |
| JP | 2008-164429 A | 7/2008 |
| JP | 2009-025308 | 2/2009 |
| JP | 2009-180719 A | 8/2009 |
| JP | 2009-222578 | 10/2009 |
| JP | 2010-223837 A | 10/2010 |
| JP | 2011-64640 A | 3/2011 |
| JP | 2011-143138 A | 7/2011 |
| JP | 2012-090770 A | 5/2012 |
| JP | 2012-112928 | 6/2012 |
| JP | 2012-154737 A | 8/2012 |
| JP | 2013-178242 A | 9/2013 |
| JP | 2014-198831 A | 10/2014 |
| WO | WO 97/42877 A1 | 11/1997 |
| WO | WO 2008/044439 A1 | 4/2008 |
| WO | WO 2011/093127 | 8/2011 |
| WO | WO 2012/101879 A1 | 8/2012 |
| WO | WO 2012/101880 A1 | 8/2012 |
| WO | WO 2012/101881 A1 | 8/2012 |
| WO | WO 2012/101883 A1 | 8/2012 |

OTHER PUBLICATIONS

Arcan F. Dericioglu et al., "Effect of Chemical Composition on the Optical Properties and Fracture Toughness of Transparent Magnesium Aluminate Spinel Ceramics," Materials Transactions, vol. 46, No. 5, Jan. 1, 2005, pp. 996-1003, XP055787331.
U.S. Appl. No. 13/981,372, filed Oct. 1, 2013, Sugiyama et al.
U.S. Appl. No. 13/981,490, filed Oct. 1, 2013, Sugiyama et al.
International Preliminary Report on Patentability dated Apr. 12, 2018 for PCT/JP2016/072441.
European Search Report dated Oct. 7, 2014 that issued in European Patent Application No. 11856651.2.
European Search Report dated Jun. 12, 2017 that issued in European Patent Application No. 11857135.5.
European Search Report dated Mar. 21, 2017 that issued in European Patent Application No. 11857086.0.
Japanese Office Action dated Dec. 2, 2014 that issued in Japanese Patent Application No. P2012-230076.
Chinese Office Action dated Feb. 25, 2015 that issued in Chinese Patent Application No. 201180066055.7.

* cited by examiner

RADIATION IMAGE ACQUISITION SYSTEM AND RADIATION IMAGE ACQUISITION METHOD

TECHNICAL FIELD

The present disclosure relates to a radiation image acquisition system and a radiation image acquisition method.

BACKGROUND ART

As disclosed in Patent Document 1, there is known an X-ray inspection apparatus including a fluorescent plate that converts X-rays emitted from an X-ray source and transmitted through a specimen into light and CCD cameras that capture images of the fluorescent plate. This apparatus uses a fluorescent plate constituted by a front-surface fluorescent plate located at an X-ray irradiation plane, a back-surface fluorescent plate located on the back side of the irradiation plane, and a metal filter located between them. The CCD cameras include a high-energy CCD camera and a low-energy CCD camera. The front-surface fluorescent plate and the back-surface fluorescent plate convert X-rays transmitted through a specimen into scintillation light. The two CCD cameras described above then perform image capturing.

CITATION LIST

Patent Literature

Patent Document 1: Japanese Unexamined Patent Publication No. 2008-164429

SUMMARY OF INVENTION

Technical Problem

The present inventors have developed a radiation image acquisition system to which a so-called double-sided scintillation detector (DSSD) scheme is applied. In this scheme, the low-energy camera captures an image of scintillation light output from the front surface of the scintillator, and the high-energy camera captures an image of scintillation light output from the back surface of the scintillator.

Conventionally, assuming that an object from which a radiation image is to be captured is constituted by substances with different radiation transmittances, it has been considered that contrast differences appear in a radiation image due to differences in radiation transmittance. For this reason, in photographing based on the double-sided scintillation detector scheme, a low-energy camera captures an image of a substance with a high radiation transmittance, and a high-energy camera captures an image of a substance with a low radiation transmittance. Assuming that characters, patterns, or the like are printed in ink on a thin plastic sheet-like member. In this case, since such plastic and ink have similar radiation transmittances, it has been considered that they are difficult to identify. In addition, when a thin plastic sheet-like member has portions with different thicknesses, since they are equal in radiation transmittance, it has been considered that it is difficult to identify the shape of the member based on differences in thickness.

The present disclosure describes a radiation image acquisition system and a radiation image acquisition method that can acquire sharp radiation images.

Solution to Problem

According to an aspect of the present disclosure, there is provided a radiation image acquisition system for acquiring a radiation image of an object, including a radiation source for outputting radiation toward the object, a scintillator that has an input surface to which the radiation output from the radiation source and transmitted through the object is input, converts the radiation input to the input surface into scintillation light, and is opaque to the scintillation light, an image capturing means including a lens portion focused on the input surface and for imaging the scintillation light output from the input surface and an image capturing unit for capturing an image of the scintillation light imaged by the lens portion and outputting radiation image data of the object, and an image generating unit for generating a radiation image of the object based on the radiation image data output from the image capturing means.

According to another aspect of the present disclosure, there is provided a radiation image acquisition method for acquiring a radiation image of an object, including a step (radiation output step) of outputting radiation from a radiation source toward the object, a step (conversion step) of converting the radiation input to the input surface into scintillation light by using a scintillator that has an input surface to which the radiation transmitted through the object is input and is opaque to the scintillation light, a step (imaging step) of imaging the scintillation light output from the input surface onto an image capturing unit by using a lens portion focused on the input surface, a step (image capturing step) of capturing an image of the scintillation light imaged by a lens portion by using the image capturing unit and outputting radiation image data of the object; and a step (image generating step) of generating a radiation image of the object based on the radiation image data.

According to the radiation image acquisition system and the radiation image acquisition method described above, the lens portion focused on the input surface of the scintillator images scintillation light output from the input surface onto the image capturing unit. Radiation image data of an object is then output, and a radiation image of the object is generated based on the radiation image data. In this case, the opaque scintillator is used to convert radiation into scintillation light. In addition, an image of scintillation light output from the input surface of the scintillator is captured. With these features, it is possible, for example, to obtain a contrasted radiation image of even an object constituted by substances with similar radiation transmittances based on slight differences in radiation transmittance or differences in thickness. This makes it possible to identify the outer shape of an object and characters, patterns, or the like printed on the object from an image. It is possible, in particular, to acquire a radiation image allowing clear identification of the shape, pattern, or the like of an object constituted by light elements considered difficult to clearly identify. In this case, an object constituted by substances with similar radiation transmittances may be an object constituted by substances with slightly different radiation transmittances, such as plastics and ink or an object constituted by substances with the same radiation transmittance and having portions with different thicknesses.

According to some aspects of the radiation image acquisition system, the lens portion is disposed so as to be opposed to the input surface. In this case, with a simple arrangement, it is possible to capture an image of scintillation light output from the input surface.

According to some aspects, the radiation image acquisition system further includes a conveyance apparatus disposed between the radiation source and the scintillator and for conveying the object in a conveying direction. In this case, it is possible to acquire a radiation image at a higher speed by performing image capturing in accordance with the conveying speed of the object by using, for example, a line scan camera. In addition, the radiation source may be turned on in accordance with an image capturing timing by using an area sensor camera.

According to some aspects of the radiation image acquisition system, the image capturing unit is an area image sensor capable of performing time delay integration (TDI) driving and performs charge transfer on the light receiving surface in synchronization with the movement of the object by the conveyance apparatus. In this case, a radiation image with a high S/N ratio can be acquired.

According to some aspects of the radiation image acquisition system, the tube voltage of the radiation source can be adjusted within the range of 10 kV to 300 kV, and the thickness of the scintillator is within the range of 10 μm to 1,000 μm.

According to some aspects of the radiation image acquisition system, the tube voltage of the radiation source can be adjusted within the range of 150 kV to 1,000 kV, and the thickness of the scintillator is within the range of 100 μm to 50,000 μm.

According to some aspects of the radiation image acquisition system, the image generating unit generates the radiation image of the object based on a lookup table for contrast conversion corresponding to at least the thickness of the scintillator. In this case, it is possible to properly perform contrast conversion in accordance with the thickness of the scintillator even if the contrast of a radiation image obtained by image capturing at the input surface changes.

According to some aspects of the radiation image acquisition system, the radiation source outputs radiation including characteristic X-rays of not more than 20 keV, and radiation transmitted through the object and converted by the scintillator includes characteristic X-rays of not more than 20 keV.

According to some aspects of the radiation image acquisition method, the method further includes a step (conveying step) of conveying an object in a conveying direction by using a conveyance apparatus disposed between the radiation source and the scintillator. In this case, a radiation image can be acquired at a higher speed by performing image capturing in accordance with the conveying speed of the object using, for example, a line scan camera. In addition, the radiation source may be turned on in accordance with an image capturing timing by using an area sensor camera.

According to some aspects of the radiation image acquisition method, the image capturing unit includes an area image sensor capable of performing time delay integration driving, and the image capturing step performs charge transfer on the light receiving surface of the area image sensor in synchronization with the movement of the object by the conveyance apparatus. In this case, a radiation image with a high SN ratio can be acquired.

According to some aspects of the radiation image acquisition method, the thickness of the scintillator is within the range of 10 μm to 1,000 μm, and in the radiation output step, the tube voltage of the radiation source is within the range of 10 kV to 300 kV.

According to some aspects of the radiation image acquisition method, the thickness of the scintillator is within the range of 100 μm to 50,000 μm, and in the radiation output step, the tube voltage of the radiation source is within the range of 150 kV to 1,000 kV.

According to some aspects of the radiation image acquisition method, the image generating step generates a radiation image of the object based on a lookup table for contrast conversion corresponding to at least the thickness of the scintillator. In this case, it is possible to properly perform contrast conversion in accordance with the thickness of the scintillator even if the contrast of a radiation image obtained by image capturing at the input surface changes.

According to some aspects of the radiation image acquisition method, the radiation output step outputs radiation including characteristic X-rays of not more than 20 keV, and the conversion step converts radiation transmitted through the object and including characteristic X-rays of not more than 20 keV into scintillation light.

Effects of Invention

According to some aspects of the present disclosure, it is possible to acquire sharp radiation images.

DESCRIPTION OF EMBODIMENTS

Figure 1:
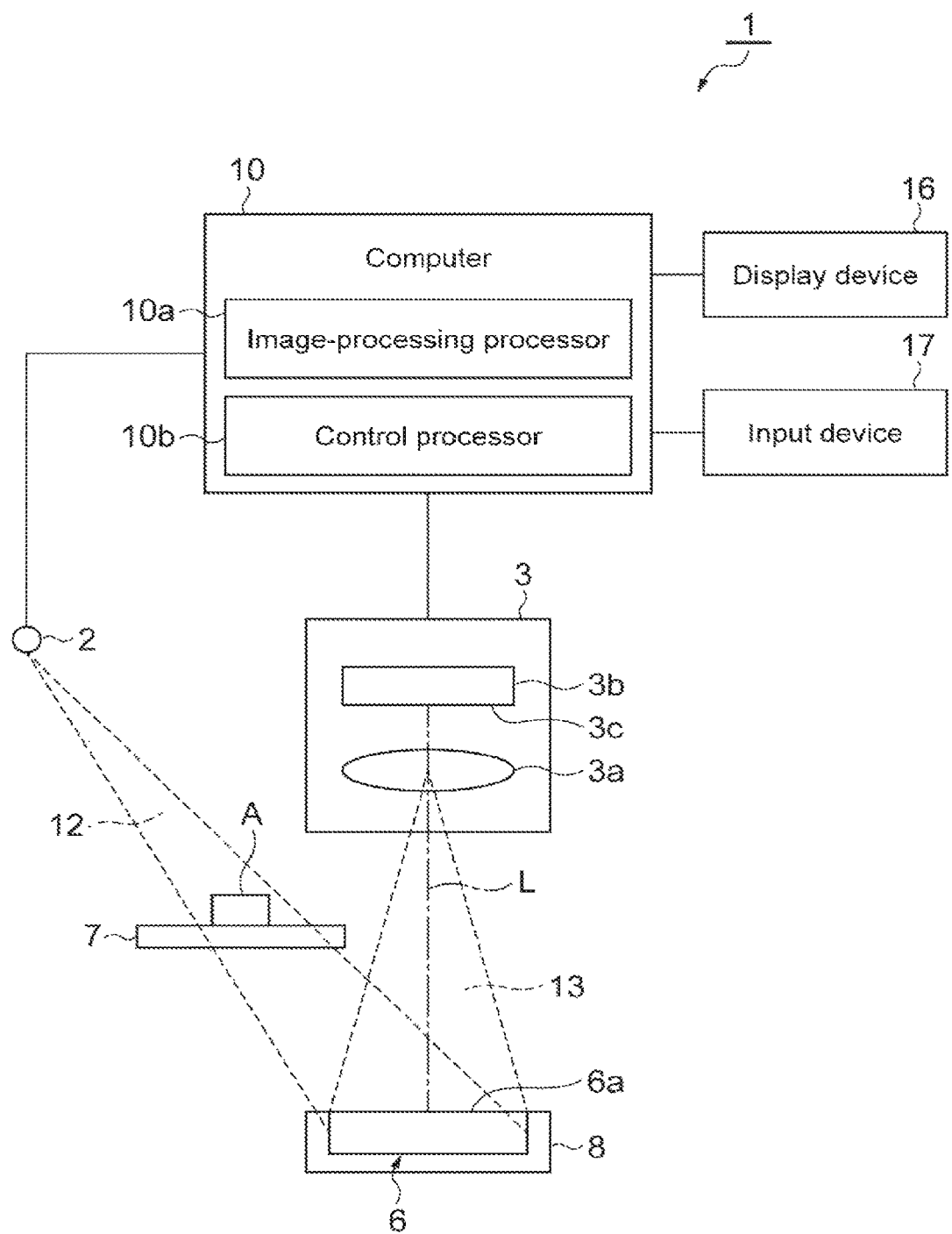
FIG. 1 is a view showing the schematic arrangement of a radiation image acquisition apparatus according to the first embodiment of the present disclosure.

Hereinafter, embodiments of the present disclosure will be described below with reference to the accompanying drawings. Note that the same reference signs denote the same elements in the description of the drawings, and any overlapping description will be omitted. Also, the respective drawings are prepared for the purpose of description, and are drawn so that the portions to be described are especially emphasized. Therefore, the dimensional ratios of respective members in the drawings are not always coincident with actual ratios.

As shown in FIG. 1, a radiation image acquisition system 1 is an apparatus for acquiring a radiation image of an object A. The object A has, for example, a composition constituted by light elements. Note, however, that the composition of the object A is not limited to this.

The object A may be an object constituted by substances with slightly different radiation transmittances. Such objects include, for example, plastic products and films on which ink is printed, food containing foreign substances such as parasites and hair, air gaps and bubbles contained in light element substances such as resins, the internal structures of composite materials such as carbon fibers and engineering plastics, and the internal structures of coatings. The object A may also be an object that is constituted by substances with the same radiation transmittance and has portions having different thicknesses. Such objects include pressed plastics and watermarked papers, microfabricated semiconductor devices, separators and electrodes as components of batteries, and their peripheral structures. As described above, the object A may be constituted by substances with similar radiation transmittances, which are conventionally considered difficult to identify using conventional radiation images. Such objects A have not been targets to be image-captured by conventional radiation image acquisition systems. On the other hand, the radiation image acquisition system 1 can acquire a contrasted radiation image of even the object A that has a composition constituted by light elements or is constituted by substances with similar radiation transmittances. A radiation image acquired by the radiation image acquisition system 1 enables identification of the outer shape of the object A and characters, patterns, or the like printed on the object A.

The radiation image acquisition system 1 includes a radiation source 2 that outputs radiation such as white X-rays toward the object A, a scintillator 6 that generates scintillation light in accordance with the input of radiation output from the radiation source 2 and transmitted through the object A, a camera (image capturing means) 3 that captures an image of scintillation light output from an input surface 6a of the scintillator 6, and a computer 10 that controls some functions of the radiation image acquisition system 1 and generates a radiation image. The radiation image acquisition system 1 further includes an object holding portion 7 that holds the object A and a scintillator holding portion 8 that holds the scintillator 6.

The radiation source 2, the camera 3, the object holding portion 7, and the scintillator holding portion 8 are accommodated in a housing (not shown) and fixed in the housing. All or at least one of the radiation source 2, the camera 3, the object holding portion 7, and the scintillator holding portion 8 may be movable to allow adjustment of the relative positional relationship between them. The computer 10 may be accommodated in the housing or disposed outside the housing. A display device (display unit) 16 and an input device (input unit) 17 are connected to the computer 10.

The radiation source 2 as a light source emits (outputs) X-rays with which the object A is irradiated. For example, the radiation source 2 emits (outputs) an X-ray cone beam from an X-ray emission point. The X-rays emitted from the radiation source 2 form a radiation flux 12. The region in which the radiation flux 12 exists is the emission region of the radiation source 2. The radiation source 2 outputs radiation including characteristic X-rays (fluorescent X-rays) of 20 keV or less. The radiation source 2 may output radiation including characteristic X-rays of 10 keV to 20 keV. The radiation source 2 may output radiation including soft X-rays. The radiation source 2 is configured to be able to adjust a tube voltage and a tube current. The tube voltage of the radiation source 2 can be adjusted between at least 10 kV and 1,000 kV. The tube current of the radiation source 2 can be adjusted between at least 10 µA to 500 mA. Characteristic X-rays of 20 keV or less can vary depending on target materials for the radiation source. For example, with tungsten (W), radiation includes characteristic X-rays of L-rays (9.8 keV). With molybdenum (Mo), radiation includes characteristic X-rays of K-rays (17.4 keV).

The radiation source 2 is disposed such that the optical axis of radiation forms a predetermined angle with respect to a normal to the input surface 6a of the scintillator 6. That is, the radiation source 2 faces the object A and the input surface 6a and is disposed at a position off the normal to the input surface 6a. In other words, the radiation source 2 is disposed such that the angle formed between its optical axis and the input surface 6a becomes larger than 0° and smaller than 90°. Note that the radiation source 2 may be disposed on the normal to the input surface 6a.

The object holding portion 7 is disposed between the radiation source 2 and the scintillator holding portion 8. The object holding portion 7 holds the object A in a state where the object A is located at least within the radiation flux 12. The object holding portion 7 holds the object A on the opposite side to the radiation source 2. A filter or the like that reduces radiation including characteristic X-rays (fluorescent X-rays) of 20 keV or less is not preferably located between the object A and the radiation source 2. This makes it possible to irradiate the object A with radiation including characteristic X-rays (fluorescent X-rays) of 20 keV or less. The object holding portion 7 is provided to reduce (minimize) its influence on radiation transmitted through the object A. For example, the object holding portion 7 may be formed from a material containing carbon fiber or the like or a low element material such as a thin film including a plastic material, film material, or metal material. In addition, the object holding portion 7 may be provided with an opening portion smaller than the object A to prevent the object holding portion 7 from entering the observation field of view. When the object A is held by the object holding portion 7, the object holding portion 7 may be disposed outside the observation field of view. Alternatively, the object A and the object holding portion 7 may be disposed to prevent the object A from overlapping the object holding portion 7 on an image.

The scintillator 6 is a wavelength conversion member in the form of a plate (for example, a flat plate). The scintillator 6 has the input surface 6a to which radiation transmitted through the object A is input. The input surface 6a is the front-side surface (front surface) opposed to the radiation source 2. The input surface 6a serves as an observation surface in the radiation image acquisition system 1. The radiation image acquisition system 1 uses the input surface 6a of the scintillator 6 as an observation surface.

The scintillator 6 converts radiation transmitted through the object A and input to the input surface 6a into scintillation light. The scintillator 6 converts radiation including characteristic X-rays of 20 keV or less, which is transmitted through the object A and input to the input surface 6a, into scintillation light. Radiation with relatively low energy is converted on the input surface 6a side and is made to exit (output) from the input surface 6a. Radiation with relatively high energy is converted on the back surface of the scintillator 6 and hence is made difficult to exit from the input surface 6a. For this reason, in the radiation image acquisition system 1 using the input surface 6a as an observation surface, scintillation light converted from radiation with relatively low energy is used for the formation of a radiation image.

In this embodiment, the scintillator 6 is a scintillator opaque to scintillation light. The scintillator 6 is, for example, a scintillator formed by evaporating, applying, depositing, or crystal-growing a fluorescent material on a base or a scintillator formed by embedding a fluorescent material in a plastic container. In addition, the scintillator 6 is, for example, a granular scintillator or columnar scintillator.

The thickness of the scintillator 6 is set to a proper value within the range of several μm to several cm. In this embodiment, in particular, the thickness of the scintillator 6 is set to a proper value based on the tube voltage of the radiation source 2. The thickness of the scintillator 6 may be set to a proper value based on the energy band of detected radiation. The thickness of the scintillator 6 may be set to a proper value based on the composition or thickness of the object A.

More specifically, the thickness of the scintillator 6 is within the range of 10 μm to 50,000 μm. When the tube voltage of the radiation source 2 is set within the range of 10 kV to 300 kV, the thickness of the scintillator 6 is set to a value within the range of 10 μm to 1,000 μm. When the tube voltage of the radiation source 2 is set within the range of 150 kV to 1,000 kV, the thickness of the scintillator 6 is set to a value within the range of 100 μm to 50,000 μm.

The opacity of the scintillator 6 will be described in detail. A scintillator opaque to scintillation light is a scintillator exhibiting a light transmittance of 80% or less at the wavelength of scintillation light by scattering or absorbing the scintillation light inside the scintillator. According to such an scintillator, when light with the same wavelength as that of scintillation light is input to the input surface 6a of the scintillator 6, the amount of light output from a back surface 6b of the scintillator 6 becomes 80% or less of the amount of input light. The light transmittance of the scintillator 6 may be within the range of 0% to 60% (wavelength of scintillation light: 550 nm) when the scintillator 6 has a thickness of 1,000 μm (1 mm). The radiation image acquisition system 1 uses the opaque scintillator 6 to exhibit the usefulness of front-surface observation with respect to the object A constituted by substances with similar radiation transmittances (in particular, the object A constituted by light elements).

The scintillator holding portion 8 holds the scintillator 6 while the scintillator 6 is located at least inside the radiation flux 12. The scintillator holding portion 8 holds the back surface side of the scintillator 6 so as to expose the input surface 6a of the scintillator 6. This makes the input surface 6a opposed to both the radiation source 2 and the camera 3. The radiation source 2 and the camera 3 are arranged in different directions without overlapping each other when viewed from the position of the scintillator holding portion 8. The scintillator holding portion 8 is configured to allow replacement of the held scintillator 6 so as to allow selection of one of scintillators 6 with different thicknesses or of different types in accordance with the tube voltage of the radiation source 2 to be used. That is, the scintillator holding portion 8 is configured to change the size (length, width, and height) and shape of a portion to which the scintillator 6 is attached. The scintillator holding portion 8 may have a light blocking effect. In addition, although the scintillator holding portion 8 is preferably provided with an antireflection treatment, the scintillator holding portion 8 may cause reflection.

The camera 3 is an image capturing means of an indirect conversion scheme that captures a projection image (that is, a radiographic transmission image) of the object A, which is projected onto the scintillator 6, from the input surface 6a side of the scintillator 6. That is, the camera 3 is an image capturing means on the input surface 6a side. The camera 3 includes a lens (lens portion) 3a that images scintillation light output from the input surface 6a of the scintillator 6 and an image sensor (image capturing unit) 3b that captures an image of scintillation light imaged by the lens 3a. The camera 3 may be a lens coupling type photodetector.

The camera 3 is disposed on a side to which the input surface 6a is opposed with reference to the scintillator holding portion 8. For example, the camera 3 may be disposed so as to be opposed to the input surface 6a of the scintillator 6. In this case, at least the lens 3a is disposed so as to be opposed to the input surface 6a, and optically couples the input surface 6a to the image sensor 3b. In addition, the camera 3 may be disposed to capture an image of scintillation light via a mirror (not shown) that reflects scintillation light emitted from the input surface 6a of the scintillator 6. In this case, the mirror and the lens 3a optically couple the input surface 6a to the image sensor 3b.

The lens 3a condenses scintillation light in a visual field 13. The lens 3a is disposed to adjust a focus on the input surface 6a of the scintillator 6. This makes it possible to condense scintillation light obtained by conversion relatively on the input surface 6a side of the scintillator 6. The lens 3a also condenses scintillation light output from the input surface 6a and images the scintillation light on a light receiving surface 3c of the image sensor 3b. The image sensor 3b receives scintillation light imaged by the lens 3a and photoelectrically converts the scintillation light. The image sensor 3b is electrically connected to the computer 10. The camera 3 outputs radiation image data obtained by image capturing to an image-processing processor 10a of the computer 10. As the image sensor 3b, an area image sensor such as a CCD area image sensor or CMOS area image sensor is used.

An example of the configuration of the camera 3 will be described in detail. The camera 3 is disposed such that an optical axis L of the lens 3a is perpendicular to the input surface 6a. That is, the lens 3a of the camera 3 faces the input surface 6a and is disposed on a normal to the input surface 6a. The camera 3 is disposed off the optical axis of the radiation source 2. That is, the camera 3 is disposed so as to be separate from an emission region (a region where the radiation flux 12 exists) of radiation from the radiation source 2. This prevents the camera 3 from being exposed to radiation from the radiation source 2, and prevents the occurrence of noise upon generation of a direct conversion signal of radiation inside the camera 3. The lens 3a of the camera 3 is disposed such that a perpendicular line drawn from the center of the lens 3a to the input surface 6a of the scintillator 6 is within the range of the input surface 6a, and is also disposed over the input surface 6a of the scintillator 6. This makes it possible to detect a relatively large amount of scintillation light.

Note that a mirror or the like can be provided at a position opposed to the scintillator 6, and the optical path of scintillation light can be changed as needed. In this case, since the camera 3 may not be disposed so as to be opposed to the input surface 6a of the scintillator 6, the camera 3 may be disposed on the opposite side to the input surface 6a, that is, the opposite side to the radiation source 2, with reference to the scintillator holding portion 8. One or a plurality of mirrors may be provided as optical elements for guiding scintillation light to an optical path, as needed.

Note that the configurations of the radiation source 2 and the camera 3 are not limited to those described in the above aspect. The radiation source 2 and the camera 3 are preferably provided at positions where they do not interfere with each other (or hardly interfere with each other) in terms of the relationship between the object holding portion 7 (object A) and the scintillator holding portion 8 (scintillator 6). Although the radiation source 2 and the camera 3 may be arranged on a plane including a normal to the input surface 6a of the scintillator 6, the radiation source 2 and the camera 3 may be three-dimensionally arranged around a normal to the input surface 6a, as needed.

The computer 10 is formed from a computer including a central processing unit (CPU), read only memory (ROM), random access memory (RAM), and input/output interface. The computer 10 includes an image-processing processor (image generating unit) 10a that generates a radiation image of the object A based on radiation image data output from the camera 3 and a control processor (control unit) 10b that controls the radiation source 2 and the camera 3. The image-processing processor 10a inputs radiation image data and executes predetermined processing such as image processing for the input radiation image data. The image-processing processor 10a outputs the generated radiation image to the display device 16. The control processor 10b controls the radiation source 2 based on the values of the tube voltage and tube current of the radiation source 2 which are stored by a user input operation or the like. The control processor 10b controls the camera 3 based on, for example, the exposure time of the camera 3 which is stored in accordance with a user input or the like. The image-processing processor 10a and the control processor 10b may be different processors or the same processor. In addition, the computer 10 may be programmed to execute the functions of the image-processing processor 10a and the control processor.

The display device 16 is a display that displays radiation images. As the display device 16, a known display can be used. The display device 16 displays the radiation image output from the image-processing processor 10a. The input device 17 is, for example, a keyboard or mouse. The user can input various types of parameters such as the values of the tube voltage and tube current of the radiation source 2 and the exposure time of the camera 3 by using the input device 17. The computer 10 stores various parameters input by the input device 17.

Next, an operation of the radiation image acquisition system 1, i.e., a radiation image acquisition method, will be described. First, the user prepares the object A and lets the object holding portion 7 hold the object A. When performing front-surface observation with respect to the object A, the user inputs parameters such as the values of the tube voltage and tube current of the radiation source 2 and the exposure time of the camera 3 in advance by using the input device 17 (parameter input step). The user also selects the scintillator 6. In this case, the user determines the thickness, type, or the like of the scintillator 6, and lets the scintillator holding portion 8 hold the corresponding scintillator 6. The user inputs the determined thickness and type of the scintillator 6 by using the input device 17 (scintillator selection step). The user adjusts the positions of the scintillator 6, the radiation source 2, and the camera 3 with respect to the scintillator holding portion 8, thereby positioning them. The camera 3 is provided to make the optical axis L of the lens 3a intersect the input surface 6a. The focal position of the lens 3a of the camera 3 is adjusted to the input surface 6a.

The thickness of the scintillator 6 may be within the range of 10 μm to 1,000 μm. In this case, the tube voltage of the radiation source 2 may be set within the range of 10 kv to 300 kV. In addition, the thickness of the scintillator 6 may be within the range of 100 μm to 50,000 μm. In this case, the tube voltage of the radiation source 2 may be set within the range of 150 kV to 1,000 kV. Parameters such as the tube voltage of the radiation source 2 may be set in accordance with the scintillator 6 in this manner.

The user then starts irradiation using the radiation source 2 and observation at the input surface 6a (front surface) of the camera 3. The control processor 10b of the computer 10 controls the following operations and processing. Radiation such as white X-rays is output (applied) from the radiation source 2 to the object A (radiation output step). At this time, radiation with which the object A is irradiated is preferably radiation including characteristic X-rays of 20 keV or less. In this case, radiation reaching the scintillator 6 through the object A can include characteristic X-rays of 20 keV or less. The radiation transmitted through the object A is input to the input surface 6a. The scintillator 6 then converts the radiation into scintillation light (conversion step). The lens 3a of the camera 3 images scintillation light output from the input surface 6a onto the image sensor 3b (imaging step). The image sensor 3b captures an image of scintillation light (scintillation image) imaged by the lens 3a. The camera 3 outputs the radiation image data obtained by image capturing to the image-processing processor 10a of the computer 10 (image capturing step).

Upon inputting the radiation image data, the image-processing processor 10a of the computer 10 executes predetermined processing such as image processing for the input radiation image data to generate a radiation image (image generation step). More specifically, the image-processing processor 10a determines a lookup table (LUT) for contrast conversion in accordance with input parameters (the values of the tube voltage and tube current of the radiation source 2, the exposure time of the camera 3, and the thickness and type of the scintillator 6), and generates a radiation image based on the input radiation image data. The computer 10 may save a plurality of LUTs corresponding to a plurality of parameters and may select an LUT corresponding to input parameters from the saved LUTs, or may generate an LUT based on the input parameters. In addition, the user may input an LUT corresponding to parameters. The present inventors confirmed that changing the thickness of the scintillator changes the contrast of a radiation image obtained by front-surface image capturing. Therefore, the image-processing processor 10a can acquire a radiation image having proper contrast by generating a radiation image of an object based on an LUT for contrast conversion which corresponds to at least the thickness of the scintillator. The image-processing processor 10a outputs the generated radiation image to the display device 16. The display device 16 displays the radiation image output from the image-processing processor 10a.

A radiation image by front-surface observation with respect to the object A is obtained through the above steps. A radiation image acquired by the radiation image acquisition system 1 enables clear identification of the shape (outer shape or the like) and printed pattern of even the object A constituted by substances with similar radiation transmittances, such as a plastic object on which characters and patterns are printed or a plastic object obtained by a pressing process. Such a radiation image, in particular, enables clear identification of the shape (outer shape or the like) of even the object A constituted by light elements, such as a plastic object. In addition, for example, even slight differences in thickness of an object formed from a single material are reflected in a radiation image, thereby enabling identification of fine embossing applied to the object A or characters, patterns, or the like printed on the object A.

According to the radiation image acquisition system 1 and the radiation image acquisition method, the opaque scintillator 6 is used for conversion from radiation to scintillation light. In addition, this system captures an image of scintillation light output from the input surface 6a of the scintillator 6. With these characteristics, it is possible to obtain a contrasted radiation image even from the object A constituted by substances with similar radiation transmittances. It is possible, in particular, to acquire a radiation image that enables clear identification of the shape or the like of an object constituted by light elements. This enables identification of the outer shape of the object A, a fine concave/convex pattern, characters or patterns printed on the object, or the like from an image.

Conventionally, a radiation image of an indirect conversion scheme using a scintillator is based on the premise that it is obtained by capturing an image of scintillation light output from the back surface of the scintillator 6. The present inventors found that the conventional observation scheme based on such premise cannot obtain a sharp image of the object A constituted by substances with similar radiation transmittances, and made an earnest investigation. As a result, the present inventors found that this problem can be solved by observation at the input surface 6a by using the opaque scintillator 6. Embodiments and comparative examples will be described later.

The radiation image acquisition system 1 has the lens 3a disposed so as to be opposed to the input surface 6a. Accordingly, this simple arrangement can capture an image of scintillation light output from the input surface 6a.

The image-processing processor 10a generates a radiation image of the object A based on an LUT for contrast conversion corresponding to at least the thickness of the scintillator 6. It is therefore possible to properly perform contrast conversion even if the contrast of a radiation image obtained by image capturing at the front surface changes in accordance with the thickness of the scintillator 6.

Figure 2:
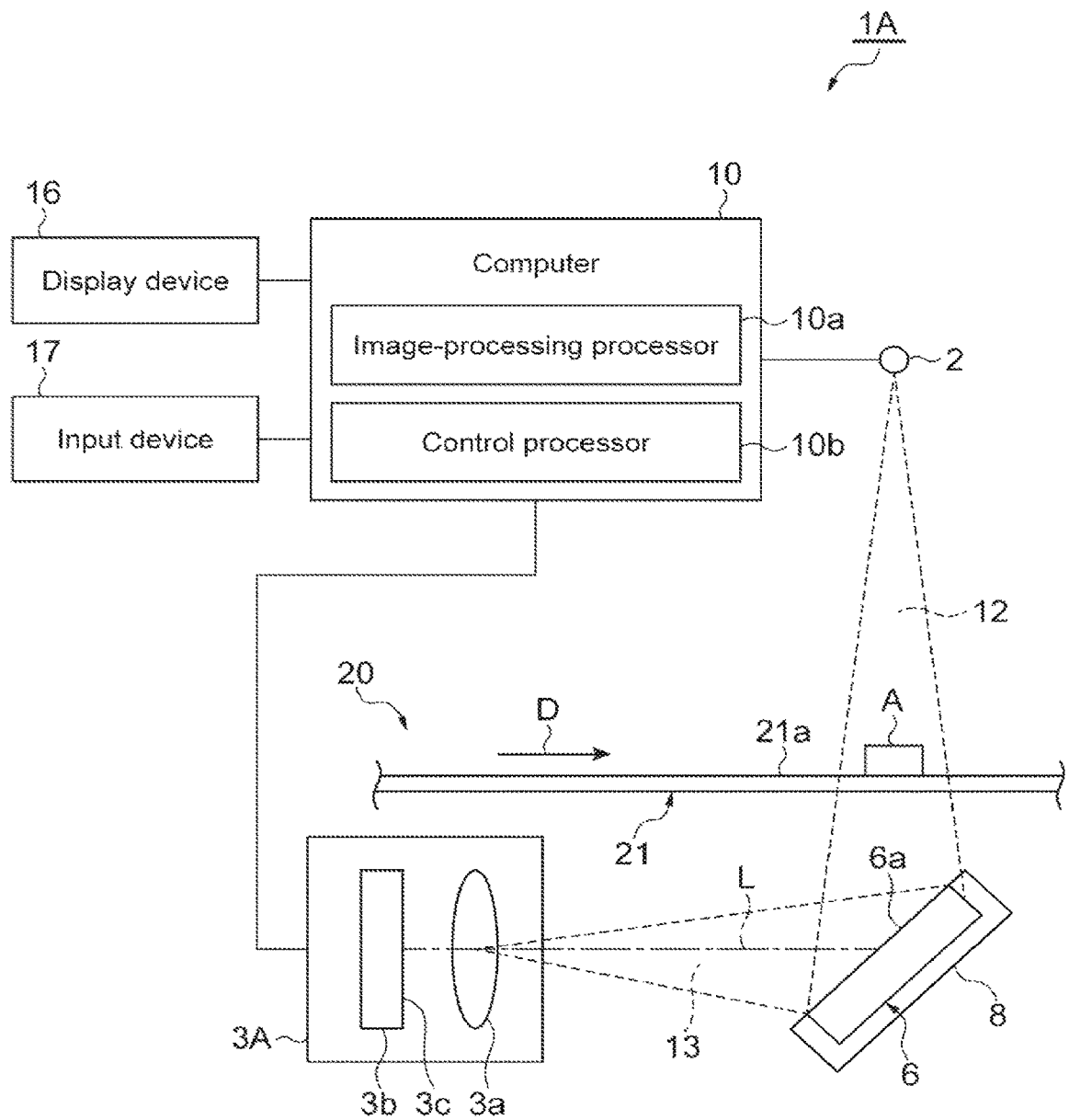
FIG. 2 is a view showing the schematic arrangement of a radiation image acquisition apparatus according to the second embodiment of the present disclosure.

A radiation image acquisition system 1A according to the second embodiment will then be described with reference to FIG. 2. The radiation image acquisition system 1A differs from the radiation image acquisition system 1 according to the first embodiment in that it includes a conveyance apparatus 20 that conveys an object A in a predetermined conveying direction D in place of the object holding portion 7 that holds the object A in a resting state, and also includes a camera 3A as a line scan camera in place of the camera 3. As shown in FIG. 2, the conveyance apparatus 20 includes a belt conveyor 21 that moves along an orbital path. The object A is placed or held on the belt conveyor 21. The conveyance apparatus 20 includes a drive source (not shown) that drives the belt conveyor 21. The belt conveyor 21 of the conveyance apparatus 20 is disposed between a radiation source 2 and a scintillator holding portion 8 (scintillator 6). The conveyance apparatus 20 is configured to convey the object A in the conveying direction D at a constant speed. A conveying timing and a conveying speed are set in advance for the object A in the conveyance apparatus 20, and are controlled by a control processor 10b of a computer 10.

The camera 3A is a line scan camera, which performs image capturing in accordance with the movement of the object A. The camera 3A includes a line sensor or an area image sensor capable of performing time delay integration (TDI) driving as an image sensor 3b. When the image sensor 3b is an area image sensor capable of performing TDI driving, in particular, the image sensor 3b is controlled by the control processor 10b to perform charge transfer in accordance with the movement of the object A. That is, the image sensor 3b performs charge transfer on a light receiving surface 3c in synchronization with the movement of the object A by the conveyance apparatus 20. This makes it possible to obtain a radiation image with a high S/N ratio. Note that when the image sensor 3b is an area image sensor, the control processor 10b of the computer 10 may control the radiation source 2 and the camera 3A to turn on the radiation source 2 in accordance with the image capturing timing of the camera 3A.

The scintillator 6 is disposed such that an input surface 6a is inclined at a predetermined angle (e.g., 45°) with respect to an optical axis L of a lens 3a of the camera 3A. In addition, the input surface 6a of the scintillator 6 is disposed so as to be inclined at a predetermined angle (e.g., 45°) with respect to the optical axis of the radiation source 2. This allows the camera 3A to be compactly disposed without causing any physical interference with the belt conveyor 21 of the conveyance apparatus 20. In this case, the lens 3a optically couples the input surface 6a to the image sensor 3b. However, the configuration is not limited to such a form, and the camera 3A may be disposed so as to capture an image of scintillation light via a mirror (not shown) that reflects scintillation light emitted from the input surface 6a of the scintillator 6. In this case, the mirror and the lens 3a optically couple the input surface 6a to the image sensor 3b.

A radiation image acquisition method using the radiation image acquisition system 1A is basically the same as the radiation image acquisition method using the radiation image acquisition system 1 described above except that a radiation output step includes a conveying step of conveying the object A by using the conveyance apparatus 20, and charge transfer (TDI operation) is performed in synchronization with the movement of the object A in an image capturing step.

The radiation image acquisition system 1A can acquire radiation images at a higher speed. In addition, this system can acquire a radiation image with a higher S/N ratio.

Embodiments and comparative examples will be described below with reference to FIG. 3A to FIG. 9B. In the following embodiments and comparative examples, as shown in FIG. 4, the present inventors investigated radiation images of a polyethylene bag (food packing bag) as one sample of the object A constituted by light elements. This bag is transparent and has one side having a jagged shape (zigzag shape). Characters are printed on an end portion of the bag. Note that this bag contains contents such as food.

Figure 3A:
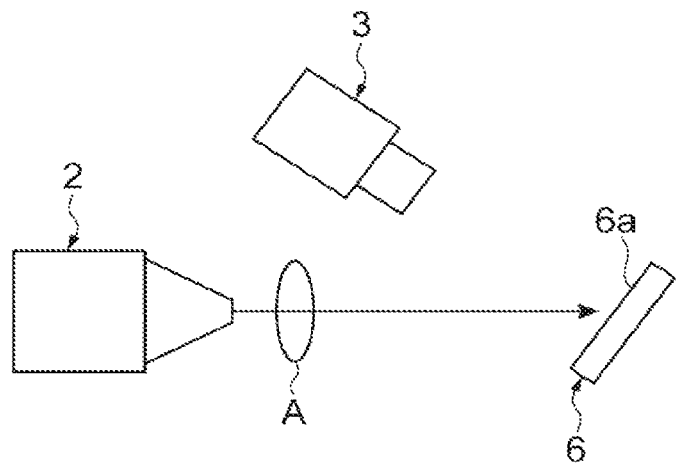
FIG. 3A is a view showing the configuration of an image capturing means according to the embodiment.
Figure 3B:
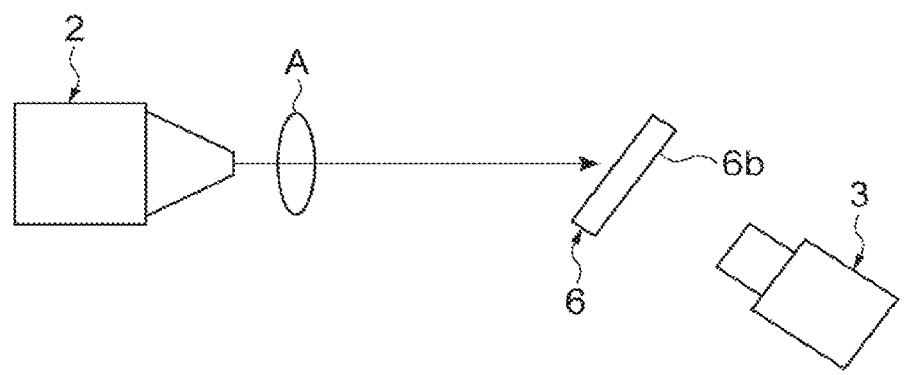
FIG. 3B is a view showing the configuration of an image capturing means according to a comparative example.
Figure 4:
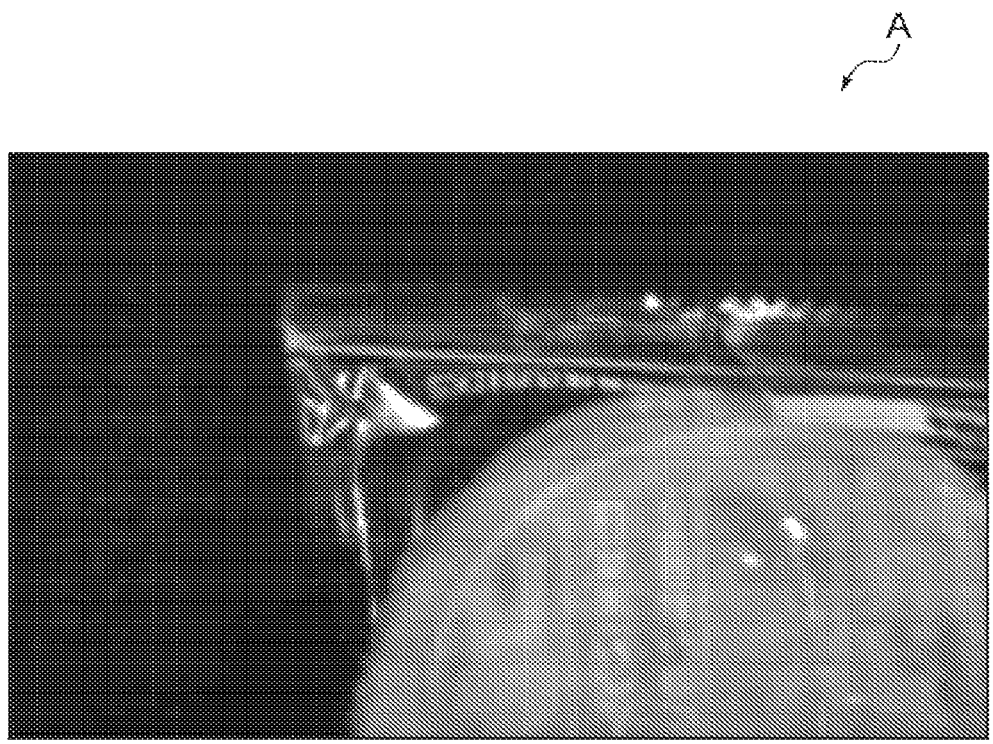
FIG. 4 is a photo showing a plastic food bag as an object.

In this embodiment, observation at the input surface 6a (front-surface photographing) was performed as shown in FIG. 3A. In a comparative example, as shown in FIG. 3B, observation at the back surface 6b (back-surface photographing) was performed. The arrangement of an apparatus used for front-surface photographing is the same as that of the radiation image acquisition system 1 according to the first embodiment, and adopted a form using an area image sensor with the object A being held in a resting state. The following embodiments and comparative examples each used the opaque scintillator 6 except for the fifth and sixth comparative examples. In the fifth comparative example, observation at the input surface 6a (front-surface photographing) was performed while a transparent scintillator was used. In the sixth comparative example, observation at the back surface 6b (back-surface photographing) was performed while a transparent scintillator was used.

Figure 5A:
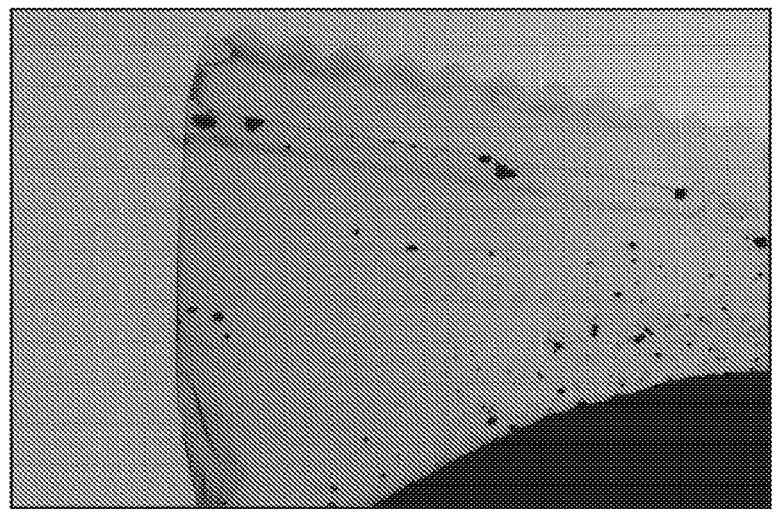
FIG. 5A is a view showing a radiation image according to the first embodiment.
Figure 5B:
FIG. 5B is a view showing a radiation image according to the first comparative example.

FIG. 5A is a view showing a radiation image according to the first embodiment. FIG. 5B is a view showing a radiation image according to the first comparative example. In the first embodiment and the first comparative example, photographing was performed with opposite photographing surfaces and different exposure times. A radiation source capable of outputting radiation including characteristic X-rays of 20 keV or less was used. In each case, an opaque GOS sheet having a thickness of 85 μm was used as a scintillator. In each case, the tube voltage of the radiation source was set to 40 kV, and the tube current of the radiation source was set to 200 μA. The exposure time for front-surface image capturing was set to 2 sec. The exposure time for back-surface image capturing was set to 10 sec. In addition, a filter for reducing radiation was not disposed between the radiation source and the scintillator.

As shown in FIG. 5A, the radiation image according to the first embodiment which was obtained by front-surface photographing allowed clear recognition of the outer shape of the object A having a zigzag shape despite the fact that the exposure time set for front-surface photographing was shorter than that for back-surface photographing. In addition, characters printed on the bag were able to be recognized. As described above, the present inventors found that a contrasted image was able to be obtained from the polyethylene bag. On the other hand, as shown in FIG. 5B, the radiation image according to the first comparative example which was obtained by back-surface photographing did not allow clear recognition of the outer shape of the bag and characters printed thereon.

Figure 6A:
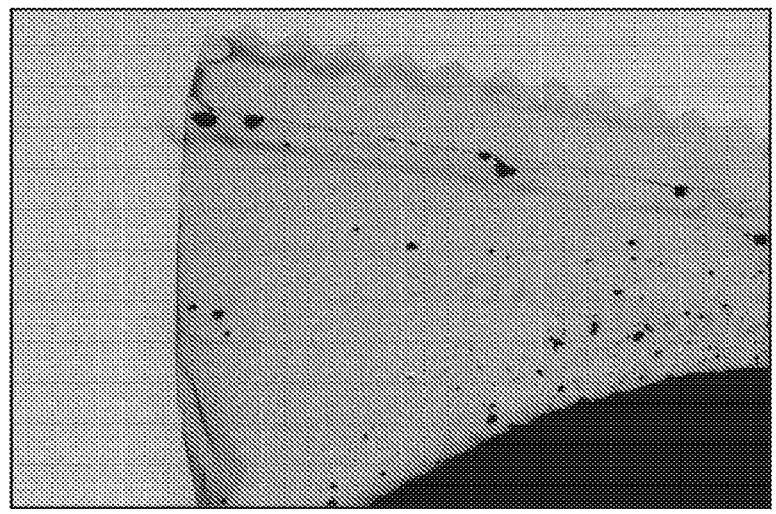
FIG. 6A is a view showing a radiation image according to the second embodiment.
Figure 6B:
FIG. 6B is a view showing a radiation image according to the second comparative example.

FIG. 6A is a view showing a radiation image according to the second embodiment. FIG. 6B is a view showing a radiation image according to the second comparative example. In the second embodiment and the second comparative example, photographing was performed under the same conditions except that opposite surfaces were set as photographing surfaces, and different exposure times were set. A radiation source capable of outputting radiation including characteristic X-rays of 20 keV or less was used. In each case, an opaque GOS sheet having a thickness of 85 μm was used as a scintillator. In each case, the tube voltage of the radiation source was set to 100 kV, and the tube current of the radiation source was set to 200 μA. The exposure time for front-surface image capturing was set to 1 sec. The exposure time for back-surface image capturing was set to 2 sec. In addition, a filter for reducing radiation was not disposed between the radiation source and the scintillator.

As shown in FIG. 6A, the radiation image according to the second embodiment which was obtained by front-surface photographing allowed clear recognition of the outer shape of the object A having a zigzag shape despite the fact that the exposure time set for front-surface photographing was shorter than that for back-surface photographing. In addition, this image allowed recognition of characters printed on the bag. As described above, the present inventors found that a contrasted image was able to be obtained from the polyethylene bag. As compared with the radiation image according to the first embodiment shown in FIG. 5A, increasing the voltage from 40 kV to 100 kV enabled recognition of the shape of the bag and characters printed thereon in each case. In general, increasing the tube voltage will shift the energy of radiation output from the radiation source 2 to higher energy. A phenomenon in which even an increase in tube voltage (energy) allows recognition of the shape of a bag and characters printed thereon is considered to be unique to front-surface observation. On the other hand, as shown in FIG. 6B, the radiation image according to the second comparative example which was obtained by back-surface photographing did not allow clear recognition of the outer shape of the bag and characters printed thereon despite the fact that the comparative example adopted an exposure time of twice or more that used in the embodiment.

Figure 7A:
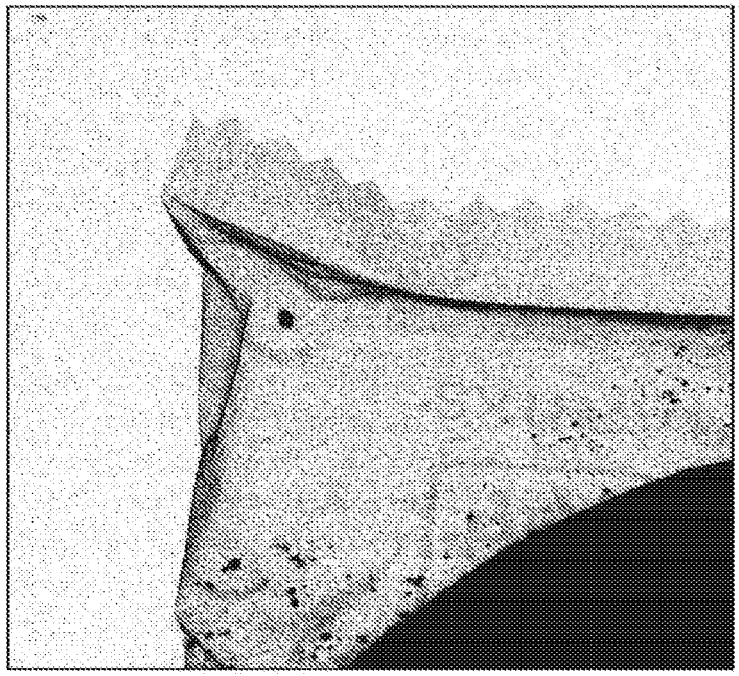
FIG. 7A is a view showing a radiation image according to the third embodiment.
Figure 7B:
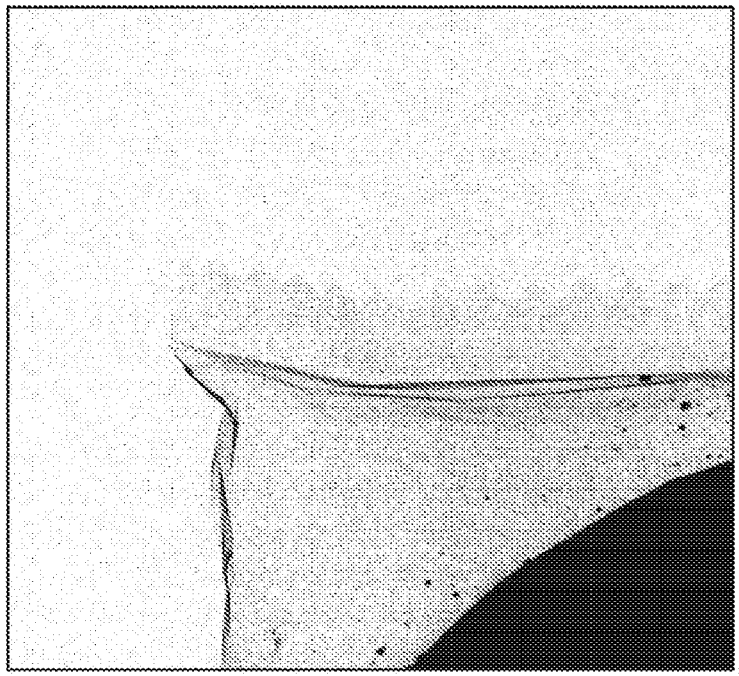
FIG. 7B is a view showing a radiation image according to the third comparative example.

FIG. 7A is a view showing a radiation image according to the third embodiment. FIG. 7B is a view showing a radiation image according to the third comparative example. In the third embodiment and the third comparative example, photographing was performed under the same conditions except that opposite surfaces were set as photographing surfaces. A radiation source capable of outputting radiation including characteristic X-rays of 20 keV or less was used. In each case, an opaque GOS sheet having a thickness of 85 μm was used as a scintillator. In each case, the tube voltage of the radiation source was set to 40 kV, and the tube current of the radiation source was set to 200 μA. The exposure time for front-surface image capturing was set to 2 sec. The exposure time for back-surface image capturing was set to 10 sec. In addition, a filter for reducing radiation was not disposed between the radiation source and the scintillator.

As shown in FIG. 7A, the radiation image according to the third embodiment which was obtained by front-surface photographing allowed clear recognition of the outer shape of the object A having a zigzag shape despite the fact that the exposure time set for front-surface photographing was shorter than that for back-surface photographing. In addition, this image allowed recognition of characters printed on the bag. As described above, the present inventors found that a contrasted image was able to be obtained from the polyethylene bag. On the other hand, as shown in FIG. 7B, the radiation image according to the third comparative example which was obtained by back-surface photographing did not allow clear recognition of the outer shape of the bag and characters printed thereon.

Figure 8A:
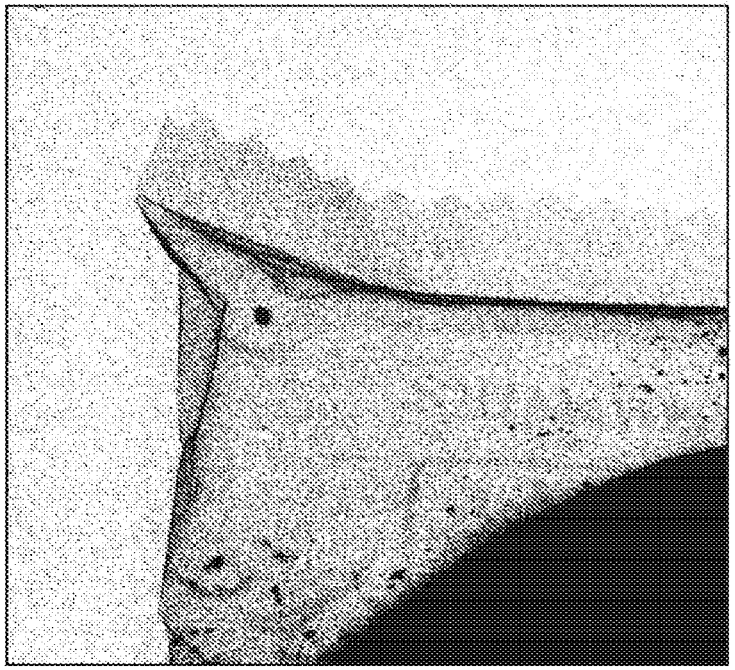
FIG. 8A is a view showing a radiation image according to the fourth embodiment.
Figure 8B:
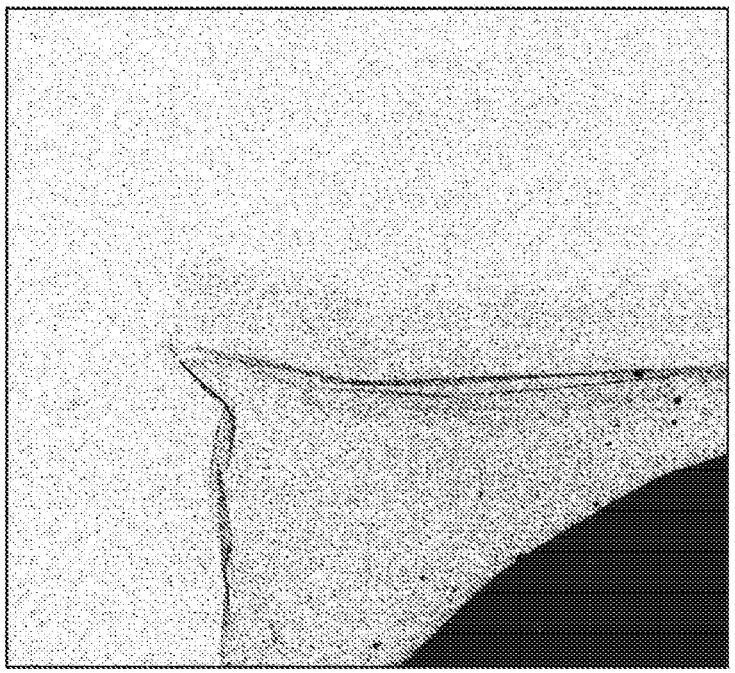
FIG. 8B is a view showing a radiation image according to the fourth comparative example.

FIG. 8A is a view showing a radiation image according to the fourth embodiment. FIG. 8B is a view showing a radiation image according to the fourth comparative example. In the fourth embodiment and the fourth comparative example, photographing was performed under the same conditions except that opposite surfaces were set as photographing surfaces. A radiation source capable of outputting radiation including characteristic X-rays of 20 keV or less was used. In each case, an opaque GOS sheet having a thickness of 85 μm was used as a scintillator. In each case, the tube voltage of the radiation source was set to 130 kV, and the tube current of the radiation source was set to 200 μA. The exposure time for front-surface image capturing was set to 1 sec. The exposure time for back-surface image capturing was set to 2 sec. In addition, a filter for reducing radiation was not disposed between the radiation source and the scintillator.

As shown in FIG. 8A, the radiation image according to the fourth embodiment which was obtained by front-surface photographing allowed clear recognition of the outer shape of the object A having a zigzag shape despite the fact that the exposure time set for front-surface photographing was shorter than that for back-surface photographing. In addition, this image allowed recognition of characters printed on the bag. As described above, the present inventors found that a contrasted image was able to be obtained from the polyethylene bag. In addition, as compared with the radiation image according to the third embodiment shown in FIG. 7A, increasing the voltage from 40 kV to 130 kV enabled recognition of the shape of the bag and characters printed thereon in each case. A phenomenon in which even an increase in tube voltage (energy) allows recognition of the shape of a bag and characters printed thereon is considered to be unique to front-surface observation. On the other hand, as shown in FIG. 8B, the radiation image according to the fourth comparative example which was obtained by back-surface photographing did not allow clear recognition of the outer shape of the bag and characters printed thereon.

Figure 9A:
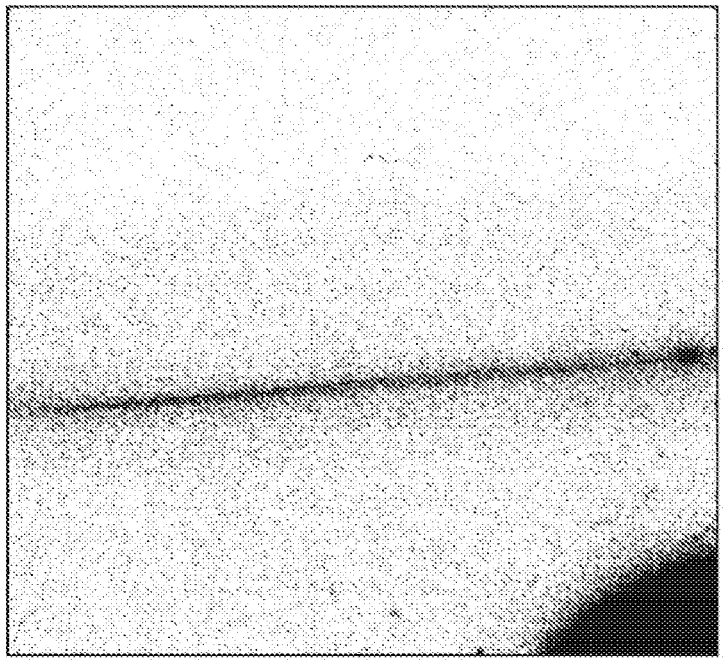
FIG. 9A is a view showing a radiation image according to the fifth comparative example.
Figure 9B:
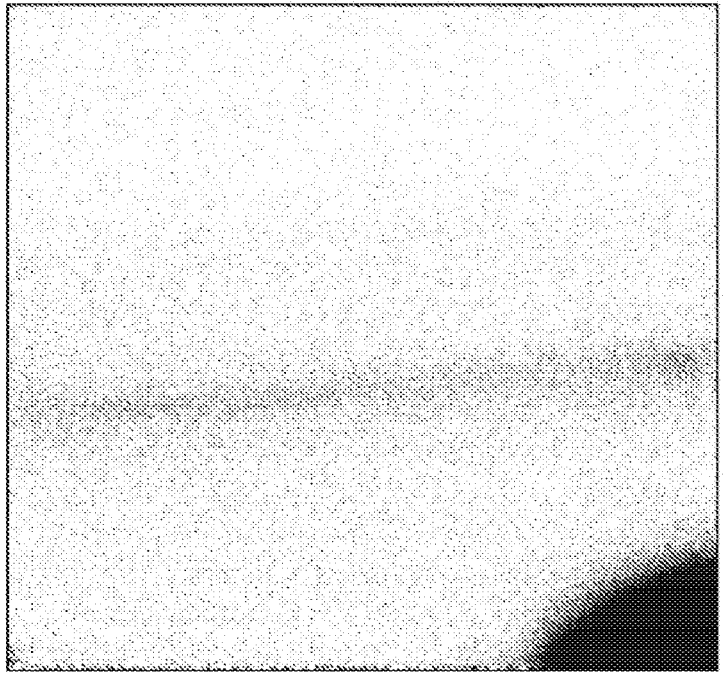
FIG. 9B is a view showing a radiation image according to the sixth comparative example.

FIG. 9A and FIG. 9B are views showing radiation images according to the fifth and sixth comparative examples. In these comparative examples, observation at the input surface 6a (front-surface photographing) was performed. Note, however, that a transparent scintillator was used. A radiation source capable of outputting radiation including characteristic X-rays of 20 keV or less was used. In each case, a transparent ceramic scintillator having a thickness of 1,400 µm (1.4 mm) was used. More specifically, transparent GOS: Pr scintillator ($Gd_2O_2S$: Pr (oxysulfide gadolinium (doped with praseodymium)) was used. In each case, the tube voltage of the radiation source was set to 130 kV, and the tube current of the radiation source was set to 200 µA. In each case, the exposure time was set to 0.5 sec. In addition, a filter for reducing radiation was not disposed between the radiation source and the scintillator.

As shown in FIG. 9A and FIG. 9B, in each of the fifth and sixth comparative examples, sharp radiation images were not able to be obtained by both front-surface photographing and back-surface photographing each using the scintillator with high visible light transmittance. There was no difference in sharpness between the images obtained by front-surface photographing and back-surface photographing.

As described above, the present inventors found that the specific phenomenon that had not been recognized up until now appears in a radiation image obtained by capturing an image of scintillation light output from the input surface 6a of the opaque scintillator 6. In addition, the present inventors found that front-surface observation at either of 40 kV, 100 kV, and 130 kV allows recognition of the shape of a bag and characters printed thereon. Therefore, this phenomenon is found to be irrelevant to tube voltage (i.e., radiation energy) and unique to front-surface observation. In addition, when the transparent scintillator was used, even front-surface observation did not allow identification of the shape of the bag and characters printed thereon. Therefore, this characteristic is found to be unique when using an opaque scintillator.

It has not been known that the shape of an object constituted by light elements such as polyethylene can be graphed by a radiation image. It has also not been known, in particular, that even characters printed on an object can be recognized. The present inventors estimated that one of the factors for the above phenomenon is that scintillation light output from the input surface 6a of the scintillator 6 reflects even the slight thickness of the object A. The specific phenomenon confirmed this time can be applied to, for example, package check (a check on whether any portion of contents is trapped in the sealed portions of a bag), watermark inspection, and contaminant inspection.

The present inventors also made various investigations on whether the above phenomenon appears in materials other than polyethylene. For example, the present inventors performed front-surface photographing and back-surface photographing by using the opaque scintillator with respect to watermark portions of paper specimens. The exposure time for back-surface photographing was set to be twice that for front-surface photographing. As a result, a radiation image obtained by front-surface photographing was able to provide contrast allowing sufficient identification of the watermark portion. On the other hand, a radiation image obtained by back-surface photographing was inferior in terms of the contrast of the watermark portion. A contrast difference of about 1200 was recognized between the radiation image obtained by front-surface photographing and the radiation image obtained by back-surface photographing at a tube voltage of 40 kV. This was about 1.5 in terms of contrast noise ratio (CNR). Note that even luminance was integrated 30 times in the radiation image obtained by back-surface photographing, the resultant contrast was inferior to that of the radiation image obtained by front-surface photographing. This has led the present inventors to confirm that front-surface photographing provides sensitivity 20 to 60 times higher than back-surface photographing.

In an experiment on paper specimens as objects, even an increase in tube voltage did not change the contrast of a watermark image, and a phenomenon specific to front-surface observation appeared as in the above embodiments concerning polyethylene specimens as objects. In the conventional technique, recognition of paper watermark images was not even conceived in the field of radiation images. On the other hand, according to the radiation image acquisition system and the radiation image acquisition method having the features disclosed above, it was found that slight differences in thickness of the same material are able to be reflected in images.

According to the above embodiments, it is also possible to clearly identify the shape, pattern, etc., of even an object constituted by substances with similar radiation transmittances. For example, it is possible to discriminate parasites existing in fresh food such as fish and foreign substances such as hair existing in processed food. Conventionally, it has been considered to be difficult to identify food and foreign substances such as parasites and hair by using radiation images because they have similar radiation transmittances. However, since photographing at the front surface of an opaque scintillator can acquire a radiation image reflecting differences in thickness of an object constituted by substances with similar radiation transmittances, it is possible to discriminate food from foreign substances.

Figure 10A:
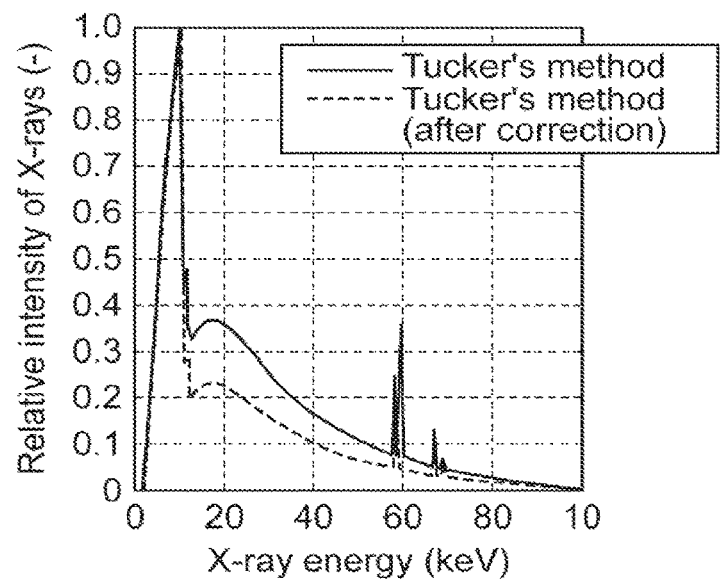
FIG. 10A is a graph showing X-ray energy spectra used for a simulation.
Figure 10B:
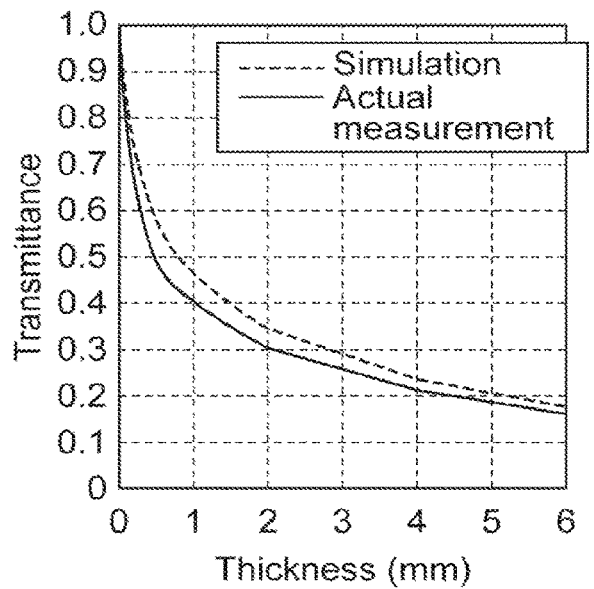
FIG. 10B is a graph showing a simulation result obtained by using an X-ray energy spectrum before correction.
Figure 10C:
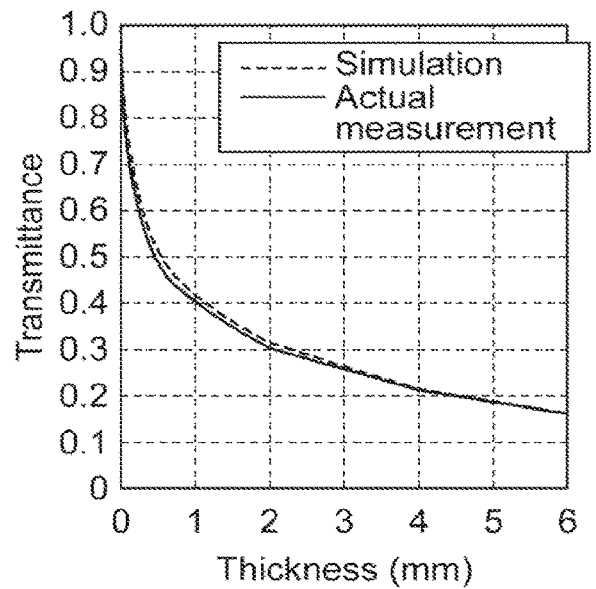
FIG. 10C is a graph showing a simulation result obtained by using an X-ray energy spectrum after correction.

In the radiation image acquisition system and the radiation image acquisition method according to the present disclosure, it is important to convert radiation including characteristic X-rays of 20 keV or less into scintillation light at the input surface 6a (front surface) of the scintillator 6. Findings by simulations will be described as follows. FIG. 10A is a view showing an X-ray energy spectrum used for a simulation. FIG. 10B is a view showing the result obtained by a simulation with an X-ray energy spectrum before correction. FIG. 10C is a view showing the result obtained by a simulation with an X-ray energy spectrum after correction.

As shown in FIG. 10A, in general, an X-ray energy spectrum can be expressed by using Tucker's formula (Tucker's method). As shown in FIG. 10A, a simulation was performed by using a radiation energy spectrum (indicated by the solid line) obtained by using Tucker's formula. As shown in FIG. 10B, a simulation result of the transmittance of aluminum (indicated by the broken line) did not match an actual measurement value (indicated by the solid line) of the transmittance of aluminum which was calculated based on an X-ray image obtained by front-surface observation.

Under circumstances as shown in FIG. 10A, the present inventors corrected an energy spectrum to obtain an energy spectrum (indicated by the broken line) by relatively enhancing characteristic X-rays in the region of 20 keV or less (that is, making characteristic X-rays dominant). A simulation was performed by using this energy spectrum after correction. As shown in FIG. 10C, a simulation result (indicated by the broken line) of the transmittance of aluminum matched well an actual measurement value (indicated by the solid line) of the transmittance of aluminum which was calculated based on an X-ray image obtained by front-surface observation.

It is found from the above description that characteristic X-rays of 20 keV or less are efficiently converted into scintillation light at the input surface 6a (front surface) of the scintillator 6.

The present invention is not limited to the above embodiments. For example, the lens portion may not be disposed so as to be opposed to the input surface.

INDUSTRIAL APPLICABILITY

According to several aspects of the present disclosure, sharp radiation images can be acquired.

REFERENCE SIGNS LIST 1, 1A . . . radiation image acquisition system, 2 . . . radiation source, 3 . . . camera (image capturing means), 3a . . . lens (lens portion), 3b . . . image sensor (image capturing unit), 3c . . . light receiving surface, 6 . . . scintillator, 6a . . . input surface, 10 . . . computer, 10a . . . image-processing processor (image generating unit), 10b . . . control processor (control unit), 20 . . . conveyance apparatus, A . . . object, D . . . conveying direction, L . . . optical axis.

The invention claimed is:

1. A system for acquiring a radiation image of a moving object, comprising:
a radiation source configured to output X-rays toward the object;
a scintillator having an input surface and configured to convert the X-rays transmitted through the object into scintillation light, the scintillator being opaque to the scintillation light;
a scintillator holder configured to hold the scintillator in a state where at least a portion of the scintillator is located within an X-rays flux of the radiation source;
a lens focused on the entire input surface of the scintillator and configured to image the scintillation light output from the input surface;
a line scan camera configured to capture an image of the scintillation light imaged by the lens in accordance with movement of the object and output radiation image data of the object; and
an image generator configured to generate a radiation image of the object based on the radiation image data,
wherein the scintillator holder is configured to hold the scintillator such that the input surface is inclined with respect to an optical axis of the lens and an optical axis of the radiation source.

2. The system according to claim 1, wherein the lens is disposed so as to be opposed to the input surface.

3. The system according to claim 1, further comprising a conveyer disposed between the radiation source and the scintillator and configured to convey the object in a conveying direction.

4. The system according to claim 1, wherein the line scan camera includes an area image sensor configured to perform time delay integration driving and capture the image of the scintillation light imaged by the lens by performing charge transfer on a light receiving surface in synchronization with movement of the object.

5. The system according to claim 1, wherein a tube voltage of the radiation source is configured to be adjusted within a range of 10 kV to 300 kV, and a thickness of the scintillator is within a range of 10 μm to 1,000 μm.

6. The system according to claim 1, wherein a tube voltage of the radiation source is configured to be adjusted within a range of 150 kV to 1,000 kV, and a thickness of the scintillator is within a range of 100 μm to 50,000 μm.

7. The system according to claim 1, wherein the image generator is configured to generate the radiation image of the object based on a lookup table for contrast conversion corresponding to at least a thickness of the scintillator.

8. The system according to claim 1, wherein the radiation source is configured to output X-rays including characteristic X-rays of not more than 20 keV, and X-rays transmitted through the object and converted by the scintillator includes characteristic X-rays of not more than 20 keV.

9. A method for acquiring a radiation image of a moving object, comprising:
outputting X-rays from a radiation source toward the object;
converting the X-rays transmitted through the object into scintillation light by using a scintillator that is opaque to the scintillation light;
imaging the scintillation light output from an input surface of the scintillator onto an line scan camera by using a lens focused on the entire input surface of the scintillator, wherein the scintillator is disposed such that the input surface is inclined with respect to an optical axis of the lens and an optical axis of the radiation source;
capturing an image of the imaged scintillation light by using the line scan camera in accordance with movement of the object and outputting radiation image data of the object; and
generating a radiation image of the object based on the radiation image data.

10. The method according to claim 9, further comprising conveying the object in a conveying direction by using a conveyer disposed between the radiation source and the scintillator.

11. The method according to claim 9, wherein the line scan camera includes an area image sensor configured to perform time delay integration driving, and
the capturing performs charge transfer on a light receiving surface of the area image sensor in synchronization with the movement of the object.

12. The method according to claim 9, wherein a thickness of the scintillator is within a range of 10 μm to 1,000 μm, and
in the outputting X-rays, a tube voltage of the radiation source is within a range of 10 kV to 300 kV.

13. The method according to claim 9, wherein a thickness of the scintillator is within a range of 100 μm to 50,000 μm, and
in the outputting X-rays, a tube voltage of the radiation source is within a range of 150 kV to 1,000 kV.

14. The method according to claim 9, wherein the generating generates the radiation image of the object based on a lookup table for contrast conversion corresponding to at least a thickness of the scintillator.

15. The method according to claim 9, wherein outputting X-rays outputs X-rays including characteristic X-rays of not more than 20 keV, and the converting converts X-rays transmitted through the object and including characteristic X-rays of not more than 20 keV into the scintillation light.

* * * * *